July 3, 1928.
E. A. BOLINDER
1,676,071
SAWING TOOL AND PLANE IRON
Filed Dec. 24, 1925    2 Sheets-Sheet 1
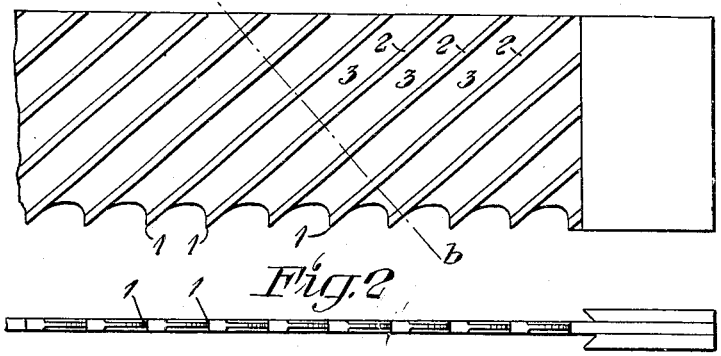
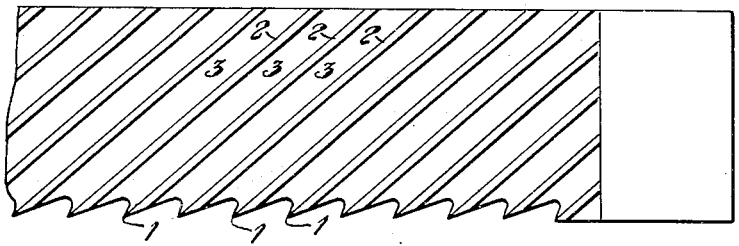
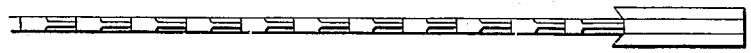
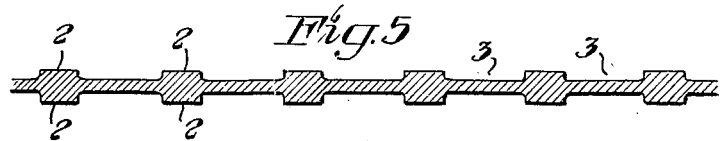
Inventor.
Eric August Bolinder
per
Attorney.

July 3, 1928.

E. A. BOLINDER 1,676,071

SAWING TOOL AND PLANE IRON

Filed Dec. 24, 1925

2 Sheets-Sheet 2

Inventor
Eric August Bolinder
per
Attorney.

Patented July 3, 1928.

1,676,071

UNITED STATES PATENT OFFICE.

ERIC AUGUST BOLINDER, OF STOCKHOLM, SWEDEN.

SAWING TOOL AND PLANE IRON.

Application filed December 24, 1925, Serial No. 77,650, and in Sweden November 2, 1925.

The present invention refers to an arrangement in such blade-shaped sawing tools and plane-irons where the one side or both sides of the blade is/are provided with channel-shaped recesses and with elevations respectively extending from the cutting portions of the blade.

The object of the present invention is to facilitate the formation of the teeth in sawing tools and plane-irons of the said type, while utilizing a certain cross-section of the elevations, in such a manner as to give those portions of the elevations, that form or constitute parts of the cutting teeth, the character of plane-irons or chisels so that they may perform their cutting operation in the same way as said tools. The toothed edge of the saw-blade will thus show a row of such plane-irons or chisels spaced at certain intervals.

Thus, the invention is substantially characterized by the fact that those portions of the elevations that coincide with the teeth are toothed in such a manner that they will have the character of plane-irons or chisels, the cutting edge of each tooth then coinciding with the front side or the rear side of the elevation corresponding to the tooth, or with a point lying between the front side and the rear side.

The arrangement is disclosed in the accompanying drawings.

Figure 7:
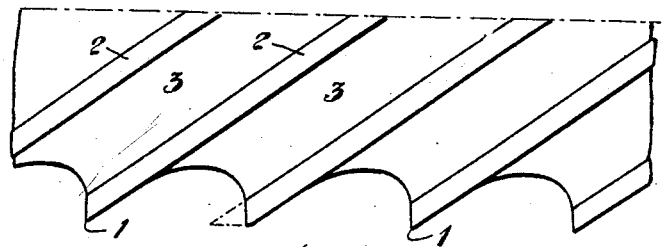
Figure 8:
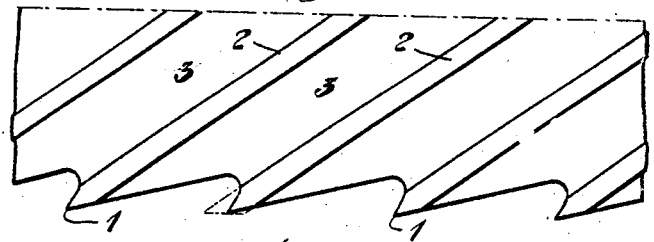
Figure 9:
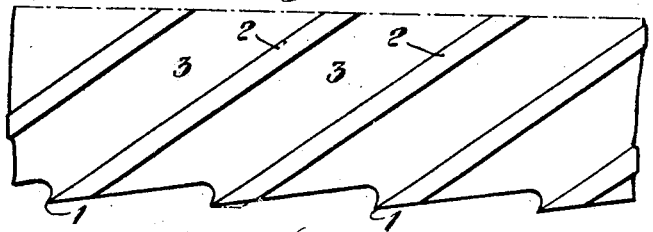
Figure 10:
Figure 11:
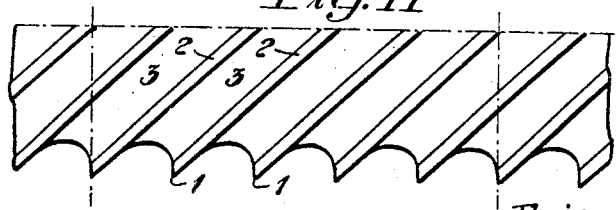

Figs. 1 and 3 show portions of saw-blades arranged in accordance with the invention, the blades being viewed from the side and toothed in different ways. Fig. 2 shows the blade according to Fig. 1 as viewed from the toothed edge, and Fig. 4 shows the toothed edge of the blade according to Fig. 3. Figs. 5 and 6 illustrate different cross sections of the blade on a larger scale, both sections being conceived as taken on the line $a$—$b$ in Fig. 1. Figs. 7, 8 and 9 illustrate, likewise on a larger scale, different ways of forming the teeth of the blade, and Figs. 10 and 11 show how the number of teeth per unit of length may be altered by altering the sloping angle of the elevations.

2 denotes the elevations, which are situated on the one side or on both sides of the blade, said elevations forming an acute angle with the toothed edge of the tool, and 3 are the intervening recesses opening into or coinciding with the teeth. The elevations 2 may, preferably, have the cross-sectional profile disclosed in Figs. 5 and 6. According to Fig. 7, the teeth are made so that the cutting edge 1 of each tooth coincides with the rear side of the corresponding elevation 2. According to Fig. 9, the edge 1 coincides with the front side of the elevation, and according to Fig. 8, the edge is situated at a point between the front side and the rear side, for example, as shown at the middle portion of the figure. In all of these tooth formations the teeth have the character of plane-irons or chisels and operate as such. With the tooth formation according to Fig. 7, the narrowest cut is made, and with the tooth formation according to Fig. 9 the widest cut will be effected. Thus the cutting width increases according as the edge 1 is brought closer to the front side of its corresponding elevation 2. In their longitudinal direction, i. e. from the one side of the blade to the other, the cutting edges may be straight or extend along a broken line or an arcuate line. By altering the sloping angle of the elevations, while retaining the same distance between them, the number of teeth, may, as will appear from Figs. 10 and 11, be increased or decreased per unit of length. The sawing tool and plane-iron toothed in the manner above set forth is very flexible and may be used to advantage also for band-saws or in other such cases where the blade has to be guided during work in an arcuate path, in some way or other.

What I claim as new and desire to secure by Letters Patent of the United States of America is:—

A blade-shaped sawing tool and plane-iron having at least one side of the blade provided with recesses and elevations extending from the cutting edge of the blade, the elevations having plane outer sides and coinciding with the cutting edge of the blade in such a manner as to form teeth the edges of which are perpendicular to the plane of the blade so that the teeth are adapted to cut like plane-irons or chisels.

In testimony whereof I affix my signature.

ERIC AUGUST BOLINDER.